Figure 1:
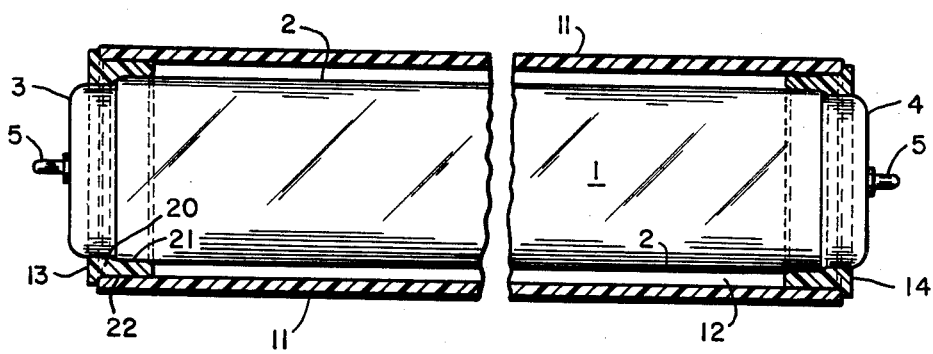

March 10, 1964     T. E. HOSKINS ETAL     3,124,307
VAPOR LAMP UNITS
Filed Feb. 15, 1963

INVENTORS
Thomas E. Hoskins
BY    Frederick J. O'Reilly

THEIR ATTORNEYS

United States Patent Office 3,124,307
Patented Mar. 10, 1964

3,124,307
VAPOR LAMP UNITS
Thomas E. Hoskins, Moon Township, Allegheny County, and Frederick J. O'Reilly, Bethel Park, Pa., assignors to Tishman Research Corporation, New York, N.Y.
Filed Feb. 15, 1963, Ser. No. 258,692
3 Claims. (Cl. 240—11.4)

This invention relates to elongated vapor lamp units, and more particularly to elongated vapor lamp units having a shield around the lamp tube and a resilient reinforcing and spacing means at each end of the lamp tube.

It is common practice to utilize vapor lamps, i.e., fluorescent lamps, for outdoor illumination at such installations as parking garages, gasoline stations, airports, and drive-in restaurants, etc. Fluorescent lamps are also commonly used on outdoor signs. Since the fluorescent lamps in use today have a maximum light output when the temperature of the surrounding atmosphere is between 70 and 80° F. and the temperature of the tube is 100–120° F., the efficiency of the lamps outdoors is decreased in cold weather and if the temperature drops extremely low, the lamps will not operate at all. A strong wind will also cause the efficiency of the lamp to decrease.

Another drawback encountered when using fluorescent lamps is the attraction of small magnetic dust particles to the outer surface of the lamp tube by the weak electrostatic field which is created by the molecular movement within the tube. After the lamp has been in use for a while, a sufficient amount of dust will have collected on the outer surface of the tube to diminish the light output so such an extent that the bulb must be cleaned. When the lamps are used outdoors, the dust accumulation proceeds at a more rapid rate than indoors, due to the higher dust content of the air, and consequently, the outdoor lamps must be cleaned more often than indoor lamps.

An additional drawback encountered when using fluorescent lamps outdoors is that small bugs, such as gnats, will perish at temperatures in the area of 90° F., and, as a result, the outer surface of the lamp tends to become covered with these bugs, especially in the summer months. This accumulation of bugs will obviously decrease the amount of light emanating from the lamp and the lamp will frequently have to be cleaned.

Since the glass tubes of fluorescent lamps are relatively fragile, they are subject to breakage by wind-borne particles when used outdoors. Also, the tube is subject to violent implosion if dropped, since it is evacuated.

When fluorescent lamps are inserted into and removed from the supporting sockets therefor, it is common practice to hold the lamp by the glass tube and twist the terminal elements or contacts into place in the sockets. This method of handling the lamps tends to exert a considerable force at the juncture of the lamp bases and the glass tube and the lamps may break at this point.

My invention provides a shield or sleeve member around the glass tube of the lamp in spaced relationship thereto so that an insulating dead air space is provided around the tube to maintain the tube at a higher temperature and thereby obtain a greater amount of light from the lamp and facilitate restarting. The shield also protects the lamp tube from an accumulation of dust and bugs and from contact with wind-borne objects. The mounting means for the shield is arranged on the lamp in such a manner that additional support is imparted at the juncture of the lamp bases and tube and this joint is reinforced.

Since the shield assembly is reusable, the initial cost to the lamp user is the only economic factor involved when installing shields on lamps.

Figure 2:
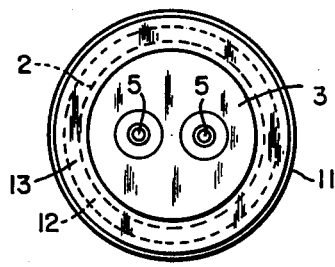

The preferred embodiment of the invention is shown in the accompanying drawings in which:

FIGURE 1 is a side elevational view, partly in section, of a vapor lamp unit embodying the invention; and
FIGURE 2 is an end view of the unit.

Referring to FIGURE 1, the lamp unit comprises a standard tubular lamp 1 having a glass tube 2 with base members designated as 3 and 4 attached at each end thereof. Each of the base members has a pair of contact pins or terminals 5 extending therethrough to support the unit in the lamp fixture sockets and to transmit electrical energy to the electrodes which are located within the tube at the ends thereof. The fluorescent lamp is a well-known type commercially available and basically consists of a glass tube which contains an electrode at each end and has its inner surface coated with a fluorescent material such as powdered phosphorus. The tube contains a small amount of mercury which, when vaporized in the arc between the electrodes, produces radiation that is converted into visible light by the fluorescent coating on the tube. The tube and base members seal the inner parts from the atmosphere and a small quantity of argon is used in the tube as a starting gas.

The major portion of the axial length of the lamp is concentrically surrounded by a protective shield or sleeve 11 which is spaced from the outer surface of the tube 2 a sufficient distance to provide an insulating or dead air space 12 between the tube and the sleeve. The sleeve 11 is spaced approximately $\frac{1}{10}''$ from the lamp tube, although this dimension is not critical. However, the spacing between the sleeve and the lamp tube should not exceed $\frac{3}{16}''$ or the diameter of the unit will be such that it cannot be used in standard fixtures.

The shield 11 must have sufficient strength to withstand the impact of objects which may be blown through the air and must not be so thick as to cause any loss of light from the lamp. Additionally, the sleeve should be light in weight and must be able to withstand elevated surface temperatures. In order to insure that the sleeve can withstand any temperature to which it may be subjected over a long period of continuous lamp use, it is desirable to utilize a material which can withstand surface temperatures of about 180° F. A material which can withstand temperatures of this magnitude will not suffer from the heat build-up in the space 12. Materials found suitable for the sleeve are acrylic plastics and styrene plastics, although other plastic materials may readily be used.

An annular support member is located at each end of the tube in order to hold the sleeve in spaced relationship with the tube. The support members are designated 13 and 14 in FIGURE 1 of the drawings. Since both support members are identical in design and function, only one is described in detail hereinafter. As the base members of the lamp have a smaller diameter than the glass tube, the inner surface of the support member is formed with a shoulder 20 which embraces the base member 3 of the lamp and a step portion 21 which is larger in diameter than shoulder 20 and embraces a portion of glass tube 2 adjacent the end thereof. The support member is preferably rounded at the point between the shoulder and the step portion in order to follow the contour of the tube end. As shown in FIGURE 1, the support member extends axially over a portion of the tube and over a portion of the base member in order to reinforce the joint between the base member and tube. The outer circumferential surface of the support member is formed with a step portion or recess 22 which tightly receives the end of sleeve 11 in order to support it around the lamp. Since the tube 2, sleeve 10 and support members 13 and 14 all have the same axis, it is readily apparent that the sleeve is concentrically positioned around the tube and the thickness of the space 12 is constant throughout the circumference of the unit. The support members 13 and 14 are made from a polyvinyl chloride plastic having a durometer range of 70–80 as such is found to be shock resistant and to have sufficient compressibility to permit the assembly of the unit. Although the plastic is preferred, the support members may readily be made from any shock resistant material which is slightly compressible. Examples of other materials which may be used with equal facility are rubber and asbestos.

The lamp unit is assembled by first placing a support member on one end of the lamp so as to surround the majority of the peripheral surface of the base member and the end portion of the glass tube. Next, the shield 11 is placed over the glass tube 2 and seated on the step portion 22 of the support member which is in place. Next, the other support member is forced between the opposite end of the lamp and the shield. Due to the relative fragileness of the glass tube 2, the support members have notched or stepped portions so that a snug fit is obtained on the tube without the use of a large degree of force which could break the tube.

The invention has important features which include a shielded vapor type lamp unit which will efficiently operate at extremely low temperatures and, therefore, is particularly adapted for outdoor use. In addition to enhancing the operation of the lamp at low temperatures, the shield protects the lamp tube from dust and small bugs and, hence, the tube will give off the maximum amount of light for a longer period of time without cleaning. Furthermore, the shielded lamp is protected from breakage due to flying objects and the shield may be reused on a new lamp after the lamp burns out.

Another important feature of the invention is provided by the manner in which the support means are positioned on the lamp. By arranging the support means to embrace both the base and the glass tube, the joint between these members is reinforced and the lamp is less likely to break at this point during installation and removal.

While this invention has been shown and described in terms of its present preferred embodiment, it should be understood that it may be likewise embodied within the scope of the following claims.

We claim:

1. A lamp unit comprising in combination an elongated tubular fluorescent lamp having an elongated glass tube and a base member at each end, said base members having a smaller diameter than the diameter of said tube adjacent the juncture of said tube and said base members; an annular resilient support member, having an outer diameter greater than the diameter of said tube, frictionally fitted over each end of the lamp, each of said support members having a shoulder portion in frictional engagement with the associated base member and a stepped portion of greater diameter than said shoulder portion in frictional engagement with a portion of the associated end of said tube so that the juncture between the base member and tube is reinforced; and an elongated transparent tubular shield member having a diameter greater than the diameter of said tube fitted over said tube and having its ends tightly held by the outer surface of said support members, whereby an insulating space is provided around the lamp tube.

2. A lamp unit as described in claim 1 wherein the inner ends of the outer surfaces of said support members are recessed, said recesses tightly receiving the ends of said shield member and the longitudinal extent of said recesses being dimensioned so that the ends of said member abut the bases of said recesses, whereby the ends of said shield member are protected.

3. A lamp unit as described in claim 1 and having an annular shoulder on the outer surface of each of said support members, said shoulders being located on said support members to abut the ends of said shield member when said shield member is tightly held by the outer surfaces of said support members.

References Cited in the file of this patent

UNITED STATES PATENTS

| | | |
|---|---|---|
| 2,308,986 | Livers | Jan. 19, 1943 |
| 2,363,109 | Keiffer | Nov. 21, 1944 |
| 2,382,939 | Koch | Aug. 14, 1945 |
| 2,413,940 | Bickford | Jan. 7, 1947 |
| 2,760,053 | Choisser | Aug. 21, 1956 |